United States Patent [19]

Stevenson

[11] Patent Number: 5,689,066
[45] Date of Patent: Nov. 18, 1997

[54] METHOD AND APPARATUS FOR ANALYZING GAS TURBINE PNEUMATIC FUEL SYSTEM

[76] Inventor: Dennis B. Stevenson, 106 Midland Dr., Lafayette, La. 70506

[21] Appl. No.: 515,273

[22] Filed: Aug. 15, 1995

[51] Int. Cl.$^6$ .................................................. G01M 15/00
[52] U.S. Cl. ........................... 73/118.1; 73/115; 73/117.3; 73/119 A
[58] Field of Search .......................... 73/115, 116, 117.2, 73/117.3, 118.1, 118.2, 119 A; 60/721

[56] References Cited

U.S. PATENT DOCUMENTS

| | | | |
|---|---|---|---|
| 3,680,371 | 8/1972 | Marcio et al. | 73/119 A |
| 4,158,884 | 6/1979 | McKinley et al. | 364/431 |
| 4,216,672 | 8/1980 | Henry et al. | 73/115 |
| 4,608,860 | 9/1986 | Charrier et al. | 73/116 |
| 4,878,348 | 11/1989 | Fridsma | 60/660 |
| 4,879,985 | 11/1989 | Day et al. | 73/119 A |
| 5,020,362 | 6/1991 | Hart et al. | 73/119 A |
| 5,261,369 | 11/1993 | Vernier | 123/336 |
| 5,314,307 | 5/1994 | Farmer | 416/2 |
| 5,321,979 | 6/1994 | McKendry et al. | 73/117.3 |
| 5,343,154 | 8/1994 | Frus | 324/399 |
| 5,493,902 | 2/1996 | Glidewell et al. | 73/119 A |
| 5,499,538 | 3/1996 | Glidewell et al. | 73/119 A |

*Primary Examiner*—George M. Dombroske
*Attorney, Agent, or Firm*—C. Dean Domingue

[57] ABSTRACT

A method of analyzing the controlling air pressures of a gas turbine pneumatic fuel system, with the system containing a fuel control device, a power turbine governor, and a gas turbine engine assembly is disclosed. The method may comprise obtaining a first baseline set of pressures from the fuel system at an initial start time. This first baseline set of pressures may also be referred to as a "footprint". Then, a second baseline set of pressures is obtained from the fuel system at a second start time. The operator would thereafter compare the first baseline set of pressures with the second baseline set of pressures. By comparison of the two sets of curves, the fuel system may be analyzed for possible problems, maintenance and service. The step of obtaining a first baseline set of pressures includes generating a curve of the pressure of the governor (Pg) and then generating a curve of the operating pressure between the governor and the fuel control device (Py). The operator may also generate a curve for the pressure of the compressor (Pc). An apparatus for analyzing a gas turbine pneumatic fuel system is also disclosed.

12 Claims, 6 Drawing Sheets

METHOD AND APPARATUS FOR ANALYZING GAS TURBINE PNEUMATIC FUEL SYSTEM

This invention relates to a method and apparatus of testing a gas turbine pneumatic fuel system. More particularly, but not by way of limitation, this invention relates to a method of diagnosing operating parameters of a gas turbine pneumatic fuel system with a novel modular monitoring apparatus.

BACKGROUND OF THE INVENTION

A brief background of a fuel control system follows. In general, the typical turbine engine fuel control system consists of a main fuel control, a power turbine governor and a double check valve. Many engines are of the free turbine engine design, meaning there is no mechanical coupling between the two turbine assemblies. The turbines include: (1) a gas producer turbine that drives the compressor; and (2) a power turbine that drives the main shaft, for instance, a helicopter rotor through the appropriate reduction gearing. The hot gas discharged by the gas producer turbine is directed to, and in turn drives, the power turbine. This arrangement provides a "gas coupling" between the turbines, and therefore, necessitates control of the output or speed of both turbines.

Generally, the gas turbine fuel control and power turbine governor provide speed governing of the power turbine rotor and overspeed protection for the gas producer rotor system. The fuel control system is a pneumatic-mechanical system and senses compressor (N1) and turbine (N2) speeds, and compressor discharge air pressure (Pc).

The fuel flow is a function of Pc as sensed in the gas turbine fuel control. Variations in fuel flow schedules are obtained by modulating the Pc pressure into two individual controlling circuits (Px and Py pressures) in the gas turbine fuel control and through the bleed-down circuit actuated by the fuel control sensing N1 revolutions per minute (RPM) and the governor sensing N2 RPM. The design of the fuel control system is based upon controlling the engine power output by controlling the N1 RPM.

The fuel control may be mounted on the fuel pump and is driven at a speed proportional to gas producer turbine speed (N1). Additional sensing parameters required by the fuel control to properly schedule fuel flow are:
Throttle angle;
Fuel Inlet Pressure (P1);
Compressor Discharge Pressure (Pc);
Regulated Air Pressure (Pr) (supplied by Power Turbine Governor);
Governor Reset Air Pressure (Pg) (supplied by Power Turbine Governor).

The turbine engine's main fuel control is primarily composed of three functional groups: (1) Fuel Section, (2) Scheduling Section, and (3) Governor Reset Section.

The power turbine governor provides a complete engine fuel controlling system. The function of the Governor is to maintain the speed of the power turbine (N2) by resetting the main fuel control. This "resetting" establishes the gas producer speed required to supply N2.

An air pressure regulator system is incorporated in the power turbine governor to provide an air pressure source that is at a fixed pressure above ambient. The regulator consists of a spring-loaded, diaphragm-operated valve. Compressor discharge pressure (Pc) is applied to the system through the Pc machine hole. The resultant pressure is then applied to the air regulator valve diaphragm and is opposed by ambient air pressure Pa and spring force.

Generally, the governing section of the power turbine governor employs a variable orifice restrictor (Pg) to modify the Pg' pressure in the main fuel control when the power turbine speed varies from the desired value.

It should be noted that in some installations, a double check valve may be employed in order to dampen torsional vibrations encountered, for instance in helicopter rotor systems.

The gas turbine engine has made significant advancements to modern day travel. Nevertheless, the gas turbine engine, and in particular, the pneumatic fuel system, is a highly sophisticated machine. Due to the types of services that the gas turbine engine provides, the proper functioning is absolutely essential.

Elaborate maintenance procedures have been developed through the years. The need for complicated instrumentation and special tooling requires that the fuel control and governor be sent to major service and over haul facilities. Not only is the engine out of service for a long period of time, the current methods provide for a trial and error type of diagnosis. In other words, once the fuel control and governor are sent to a special location, the cause of the problems must be determined, and the solution many times is a trial and error technique which is costly and time consuming.

Thus, there is a need for a method and apparatus that will test and analyze a gas turbine pneumatic fuel system. There is also a need for a method and apparatus that will allow for the testing on site, rather than removing to a hangar location.

SUMMARY OF THE INVENTION

A method of analyzing a gas turbine pneumatic fuel system, with the system containing a fuel control device, a power turbine governor, and a gas turbine engine assembly is disclosed. The method may comprise obtaining a first baseline set of pressures from the fuel system at an initial start time. This first baseline set of pressures may also be referred to as a "footprint". Then, a second baseline set of pressures is obtained from the fuel system at a second start time which could be many months later. The operator would thereafter compare the first baseline set of pressures with the second baseline set of pressures. By comparison of the two sets of curves, the fuel system may be analyzed for possible problems, maintenance and service.

In accordance with the teachings of the present invention, the step of obtaining a first baseline set of pressures includes generating a curve of the pressure of the governor (Pg) and then generating a curve of the operating pressure (Py). The operator may also generate a curve for the pressure of the compressor (Pc). The timing for taking the first baseline is when the fuel system is generally new and in good running condition. The step of obtaining a second baseline set of pressures is similar to the step of obtaining the first baseline, except that it is later in time. Thus, a curve for Pg and Py is generated. A curve for Pc may also be generated.

When the operator is generating a curve for the Fast baseline pressure (also known as the "footprint") for the Pg, Py, and Pc, pressure readings may be taken at the following data points: 15% of the compressor speed; 30% of the compressor speed; 70% of the compressor speed; and, 80% of the compressor speed. The compressor speed is referred to as "N1".

When the operator is generating a curve for the second baseline pressure for Pg, Py, and Pc, pressure readings may be taken at the following data points: 15% of the compressor speed; 30% of the compressor speed; 70% of the compressor speed; and, 80% of the compressor speed. Other data points may be taken instead of the points mentioned, or alternatively, other data points may be taken in addition to the data points previously mentioned such as at 100% turbine speed and 50% torque.

An apparatus for analyzing a gas turbine pneumatic fuel system is also disclosed. Generally, the apparatus comprises a gas turbine engine assembly, a governor, with the gas turbine engine being connected with a first conduit means for transmitting a pressure; and a fuel control device, operatively connected with the governor with a second conduit means for transmitting a pressure between the governor and the fuel control device. In accordance with the teachings of the present invention, the apparatus will also contain pressure monitoring means (such as pressure gauges) for obtaining the pressure contained within the first and second conduit means.

The pressure monitoring means may comprise a module having a pressure gauge for obtaining the pressures contained within the first and second conduit means; and tubing means, operatively connected with the first and second conduit of the fuel system, for obtaining pressure readings of the first and second conduit.

In one embodiment, the tubing means comprises a compressor discharge pressure tubing means for obtaining the pressure of the compressor (referred to as "Pc"), an operating pressure tubing means for obtaining the operating pressure of the fuel control (referred to as "Py") as well as a governor pressure tubing means for obtaining the pressure of the governor (referred to as "Pg").

In the preferred embodiment, the module will include a compressor discharge pressure gauge means for measuring the discharge pressure contained within the compressor discharge pressure tubing, an operating pressure gauge means (referred to as the servo pressure) for measuring the operating pressure contained within the operating pressure tubing means, and, a governor pressure gauge means for measuring the governor pressure contained within the governor pressure tubing means.

An advantage of the present invention is the apparatus will provide visual indications of the air pressures operating internally in the fuel control and governor during the engine start, idle, and at 100% operation. Another advantage is that the apparatus and method will help to isolate air leaks, a common problem, in the tubing which connects the fuel control to the governor.

Yet another advantage is that the method will establish a baseline footprint, or normal operating curves, for a particular fuel control and governor. Thus, the footprint can be used to compare later readings in order to diagnose the engine for problems, potential problems and/or general maintenance. Another advantage is that the method will analyze the digression in performance of the fuel control and governor by indicating air pressure changes from the norm.

A feature of the present invention includes that the invention is easily attachable to the fuel control and governor system while it is installed on the aircraft engine, rather than removal of the system and installation on a flow bench located at an overhaul facility.

Another feature of the present invention includes use of the apparatus and method as a means of training engineers and mechanics in the operation of the fuel system. Still yet another feature includes use of the method and apparatus in assisting the mechanic in determining if a problem is related to the fuel control, the governor, and/or the tubing, thereby providing a more efficient means of troubleshooting to correct the problem rather than the current trial and error method.

DESCRIPTION OF THE PREFERRED EMBODIMENTS

Figure 1:
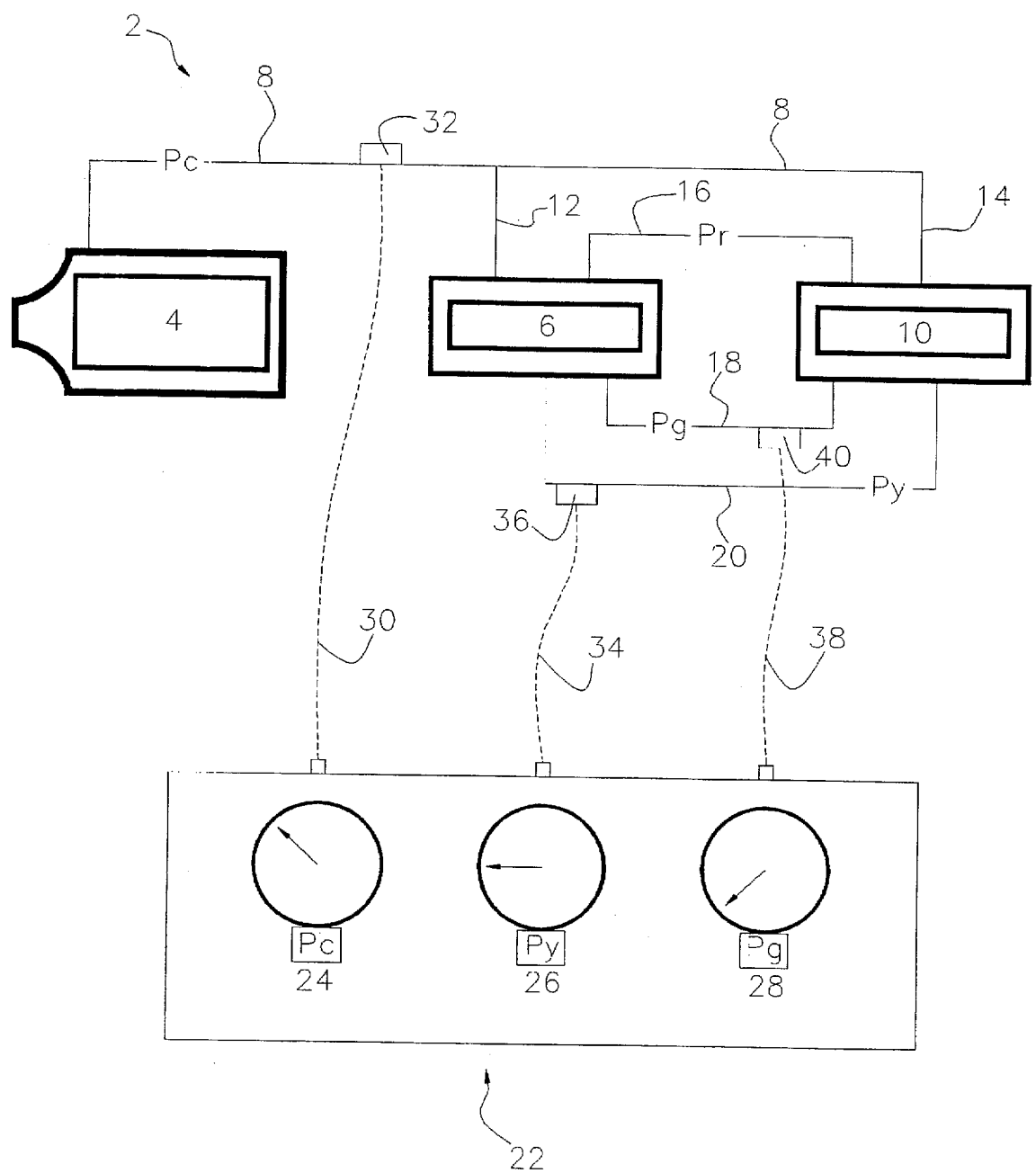
FIG. 1 is an illustration of the a Fuel Control System with an embodiment of the present invention being installed thereto.

Referring now to FIG. 1, the preferred embodiment of the present invention attached to a Fuel Control System 2 will now be described. Generally, the Fuel Control System 2 will have a gas turbine engine assembly 4 that in turn is operatively associated with a governor 6 via a first conduit 8 capable of transmitting a pressure from the gas turbine engine assembly 4. The Fuel Control System 2 will also have associated therewith a fuel control 10, with the governor 6 and fuel control 10 being pneumatically connected via a series of conduit means for transmitting pressure.

The Fuel Control System 2 depicted in FIG. 1 is commercially available from The Bendix Corporation. An Operation and Service Manual from The Bendix Corporation, published on or about 15 Dec. 1978 is incorporated herein by express reference. FIG. 1 is representative of the Fuel Control System with the attachment of the present invention. The conduit means includes a first section 12 that connects the gas turbine engine assembly 4 to the governor 6 via the conduit 8, as well as the second section conduit 14 that connects the gas turbine engine 4 with the fuel control 10 via the conduit 8.

The governor 6 and the fuel control 10 are operatively associated with one another via a series of interrelated conduits. The conduit 16 connects the governor and fuel control and generally carries the regulated pressure (Pr). The conduit 18 also connects the governor 6 and the fuel control 10 and senses the governor pressure (Pg). The conduit 20 also connects the governor 6 and the fuel control 10 and senses the servo pressure (Py) which is also referred to as the operating pressure of the fuel control.

In accordance with the teachings of the present invention, a test box 22 is included. The test box will contain in the preferred embodiment three pressure gauges: a first gauge 24, a second gauge 26, and a third gauge 28. The first gauge 24 will be connected to the conduit 8 via a flexible tube 30 and Tee-member 32. Thus, the first gauge 24 will measure the compressor discharge pressure (Pc). The second gauge 26 will be connected to the conduit 20 via a flexible tube 34 and a Tee-member 36. Thus, the second gauge 26 will measure the servo pressure (Py). The third gauge 28 will be connected to the conduit 18 via a flexible tube 38 and a Tee-member 40. Thus, the third gauge 28 will measure the governor pressure (Pg).

The fuel control 10 and power turbine governor 6 are pneumatic-mechanical units, that is, they regulate fuel flow by sensing compressor speed (N1), turbine speed (N2), compressor discharge air pressure (Pc), and the relative position of a throttle lever.

Initially, an electric starter is used to start the turbine engine 4 compressor spinning. At approximately 12%–15% N1 RPM, the operator opens the fuel control throttle lever (not shown). This introduces fuel into the engine, an ignitor plug ignites the fuel, and the engine begins to accelerate. From this point onward, the amount of fuel flow to the engine will essentially be determined by Pc pressure.

As the speed of the compressor increases, Pc pressure increases causing fuel flow to also increase. In order to provide some control over this process, Pc is modified into two opposing pressures, Px and Py, in the fuel control. When Py increases, fuel flow increases; when Px increases, fuel flow decreases. These two air pressures are controlled by flyweights, springs, bleeds and orifices, diaphragms and bellows inside the fuel control and governor as is well understood by those of ordinary skill in the art. They oppose each other and therefore provide a delicate balance that meters fuel flow very accurately.

As the RPM of the engine 4 approaches maximum, the governor will send controlling air pressure, Pr and Pg, to the fuel control reset shaft diaphragm which will cause Py to decrease when the maximum RPM is reached. The governor therefore senses the maximum RPM through flyweights and maintains a constant engine speed by controlling Py pressure in the fuel control which in turn controls fuel flow to the fuel nozzle.

Figure 2:
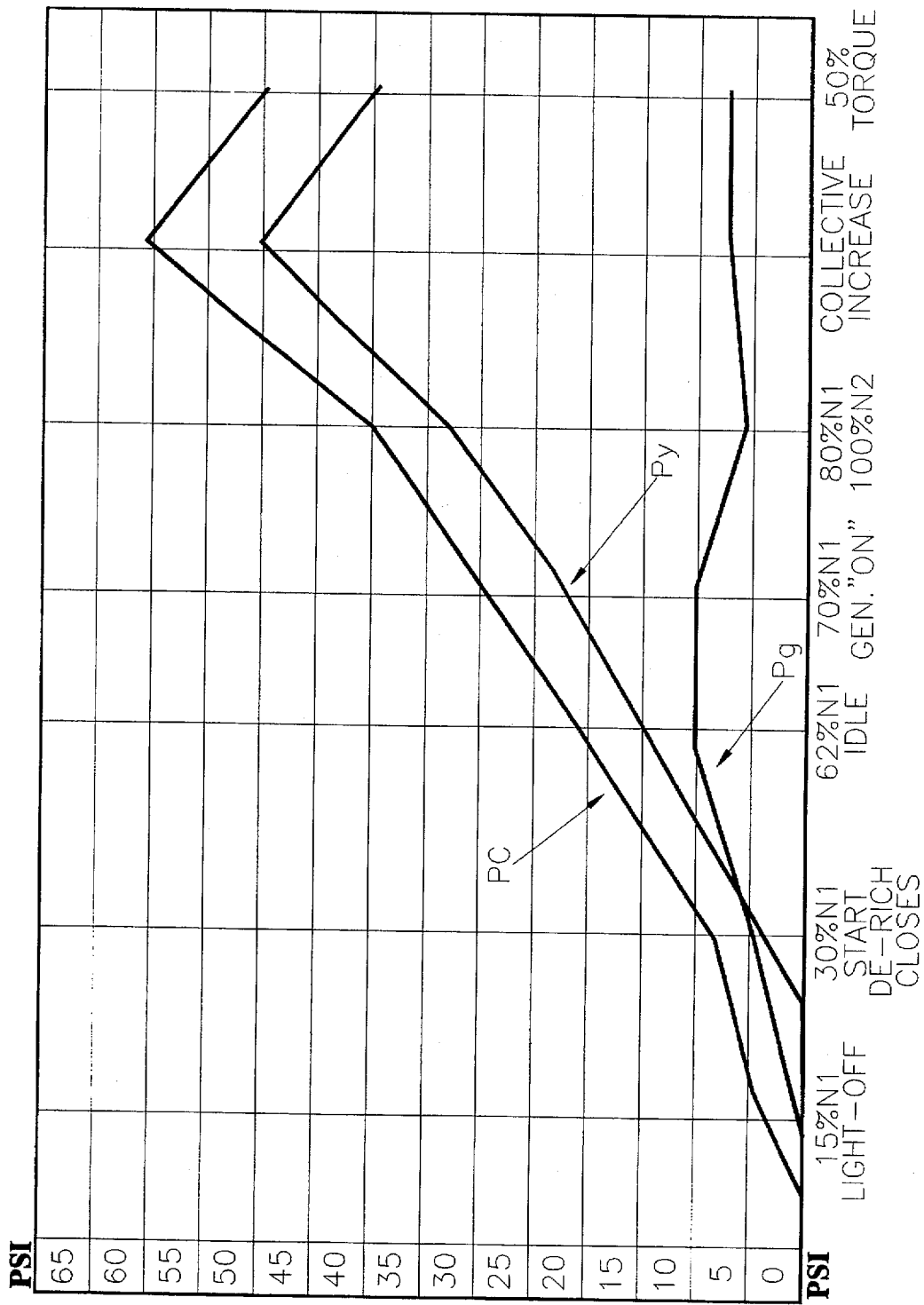
FIG. 2 is a graphical depiction of a set of curves representative of certain pressure responses taken at an initial start time.

Referring now to FIG. 2, a graphical depiction of Pc, Py, and Pg are depicted. The set of curves in FIG. 2 represent an initial set of curves for a relatively new Fuel Control System that is in good running condition. This initial condition is known as the first baseline, and the graph is referred to as the footprint. The pressure within the tubes 30, 34, 38 of FIG. 1 will be plotted versus speed of the engine. It should be understood that in order to have an initial first baseline, it is not necessary to a have a new engine. The important point is to have a footprint representative of a properly functioning fuel control system.

The first data point taken in the preferred embodiment is at 15% N1. This is known as the "lite-off". At this data point, the engine starter has turned the compressor to a speed of 15% N1. The throttle is opened, fuel is introduced into the engine, and lite-off occurs. The three pressures, namely Pc, Py, Pg are taken. It should be noted that it is possible to take only the Pg, and Py in order to assess the engine; however, in the preferred embodiment, all three (Pc, Py, and Pg) will be taken.

The second data point taken in the preferred embodiment is at 30% N1. The Pc, Py, and Pg were taken. The start de-rich valve, inside the fuel control (not shown) closes at 30% N1. It should be noted that until this point in the start sequence, the de-rich valve has been venting Py pressure to ambient. At 30% N1, the de-rich valve closes and Py pressure then builds rapidly.

The third data point taken in the preferred embodiment is at 62% N1. The Pc, Py, and Pg were taken. This point represents the idle speed of the engine. The starter has been disengaged and the engine is self-sustaining. The fourth point taken in the preferred embodiment is at 70%. This point represents the point wherein the generator is turned "on", it picks up all of the electrical load, and recharges the battery.

The fifth point taken in the preferred embodiment is at 100% turbine speed (N2). The Pc, Py, and Pg were taken. This may correspond with 80% N1, but not necessarily. At 100% N2, the engine is at its operating speed—100% turbine speed. The fuel system will try to maintain this speed through all aircraft flight conditions.

Figure 3:
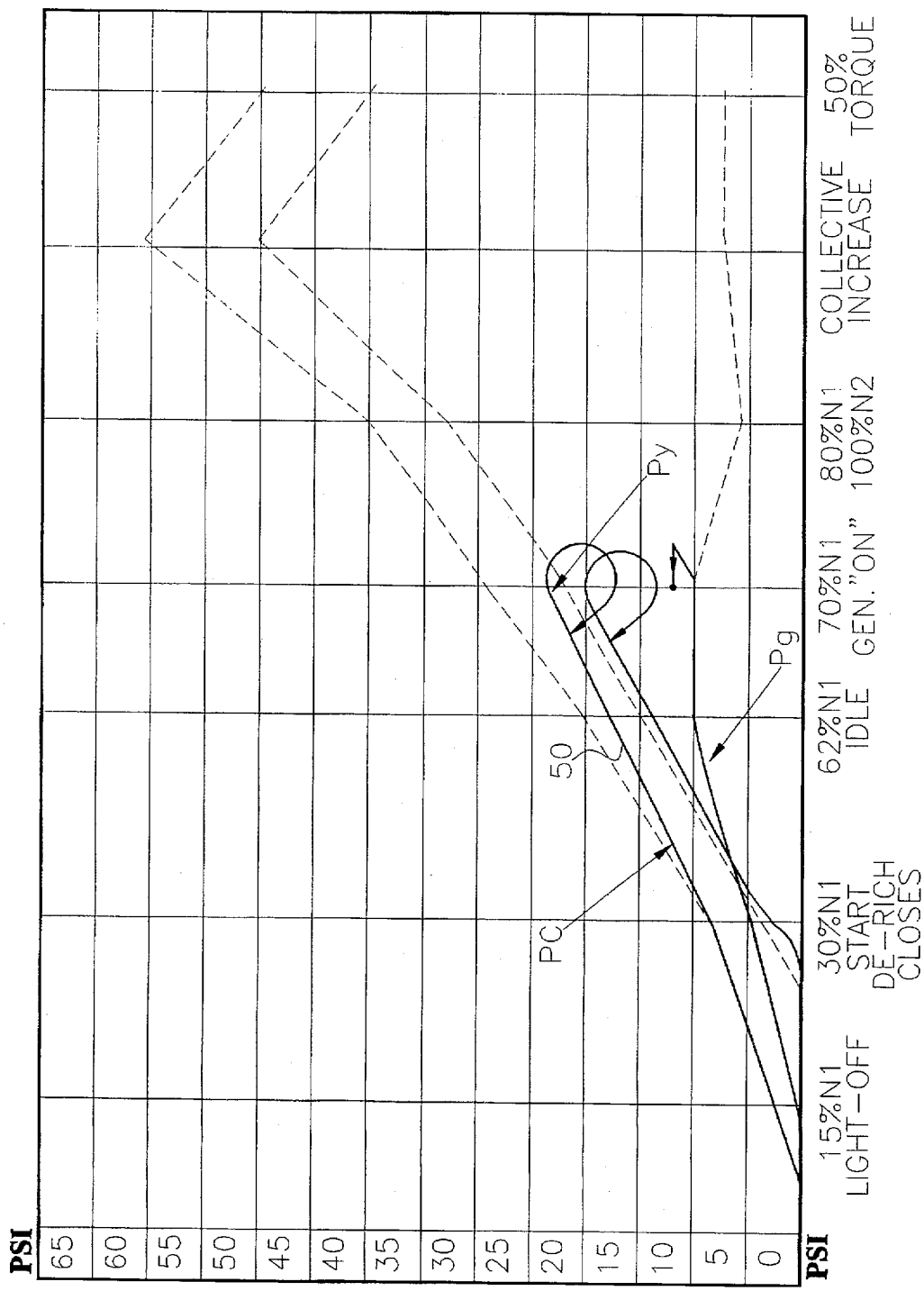
FIG. 3 is a graphical depiction of the curves of FIG. 2 along with a set of curves representative of low compressor pressure (Pc) taken at some time later than the curves of FIG. 2.

Referring now to FIG. 3, a graphical depiction of the footprint curves is set out. Also set out is the curve 50 which is representative of an engine taken at a time subsequent to the taking of the footprint curves. The curve 50 depicts the compressor pressure (Pc). As shown, the Pc response is low as compared to the initial Pc. Thus, this could represent that the engine starts, but will not accelerate to idle. Also, this could indicate engine instability above idle. Alternatively, the curve 50 could indicate that the turbine speed N2 is slow to respond. Alternatively, if this occurs during flight, uncontrolled deceleration of the engine could occur.

Thus, in accordance with the teachings of this invention, the monitoring of the engine has taken place, and based on analysis of the footprint curves and responses taken at some later time, trouble-shooting of problems has occurred. Thereafter, appropriate action could be taken to solve the problem (or problems).

Figure 4:
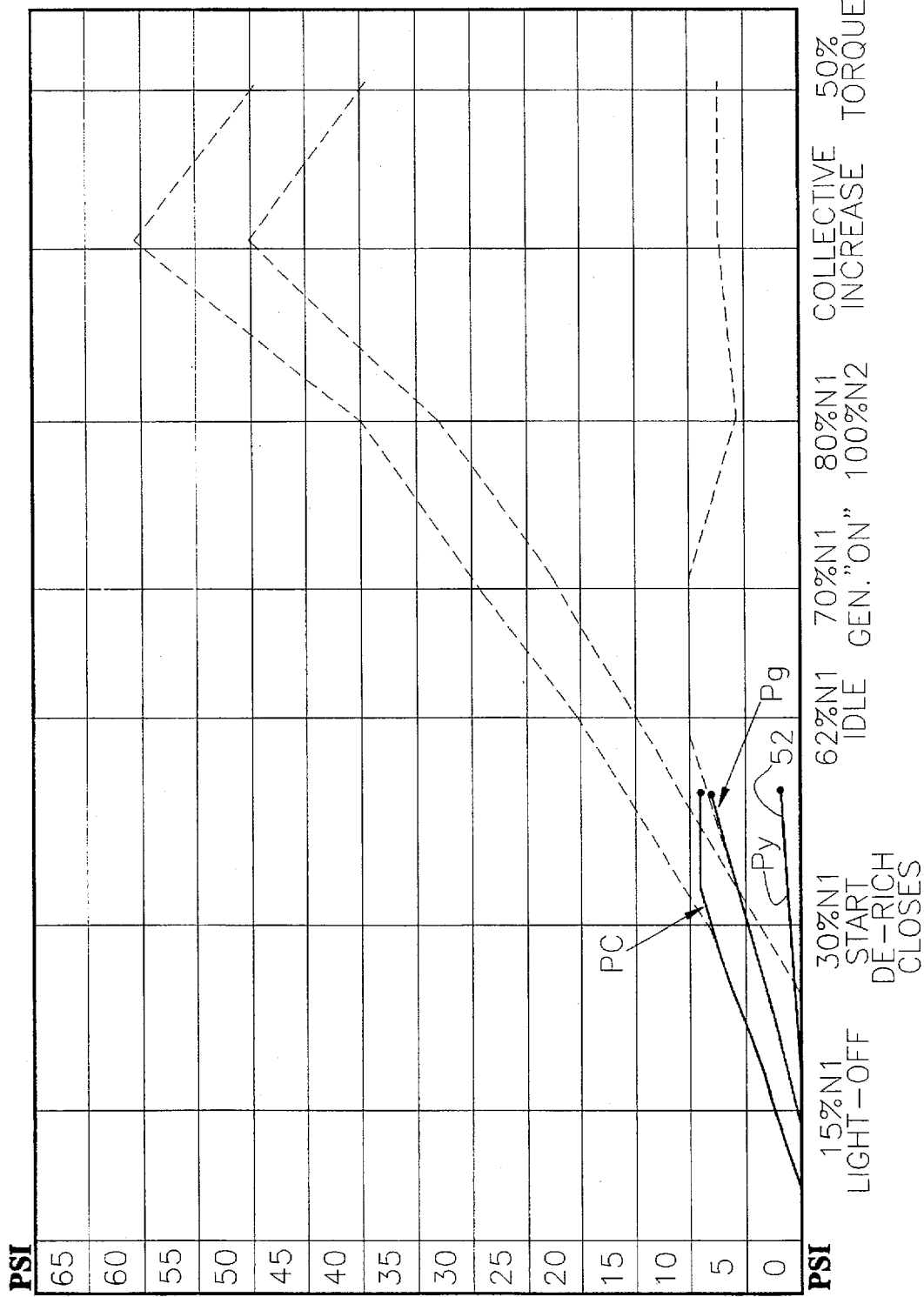
FIG. 4 is a graphical depiction of the curves of FIG. 2 along with a set of curves representative of low operating pressure (Py) taken at some time later than the curves of FIG. 2.

Referring now to FIG. 4, a graphical depiction of the footprint curves is set out. Also set out is the curve 52 which is representative of an engine taken at a time subsequent to the taking of the footprint curves. The curve 52 depicts the servo pressure (Py), also known as the operating pressure. As shown, the Py response is low as compared to the initial Py. Thus, this could represent that the engine starts, but will not accelerate to idle. Also, this could represent that the engine is unstable above the idle point. Alternatively, this could represent that the turbine speed N2 is slow to respond when power demands are made. On the other hand, curve 52 could represent that if this occurs in flight, that deceleration could occur.

Thus, in accordance with the teachings of this invention, the monitoring of the engine has taken place, and based on analysis of the footprint curves and responses taken at some later time, trouble shooting of problems has occurred. Thereafter, appropriate action could be taken to solve the problem (or problems).

Figure 5:
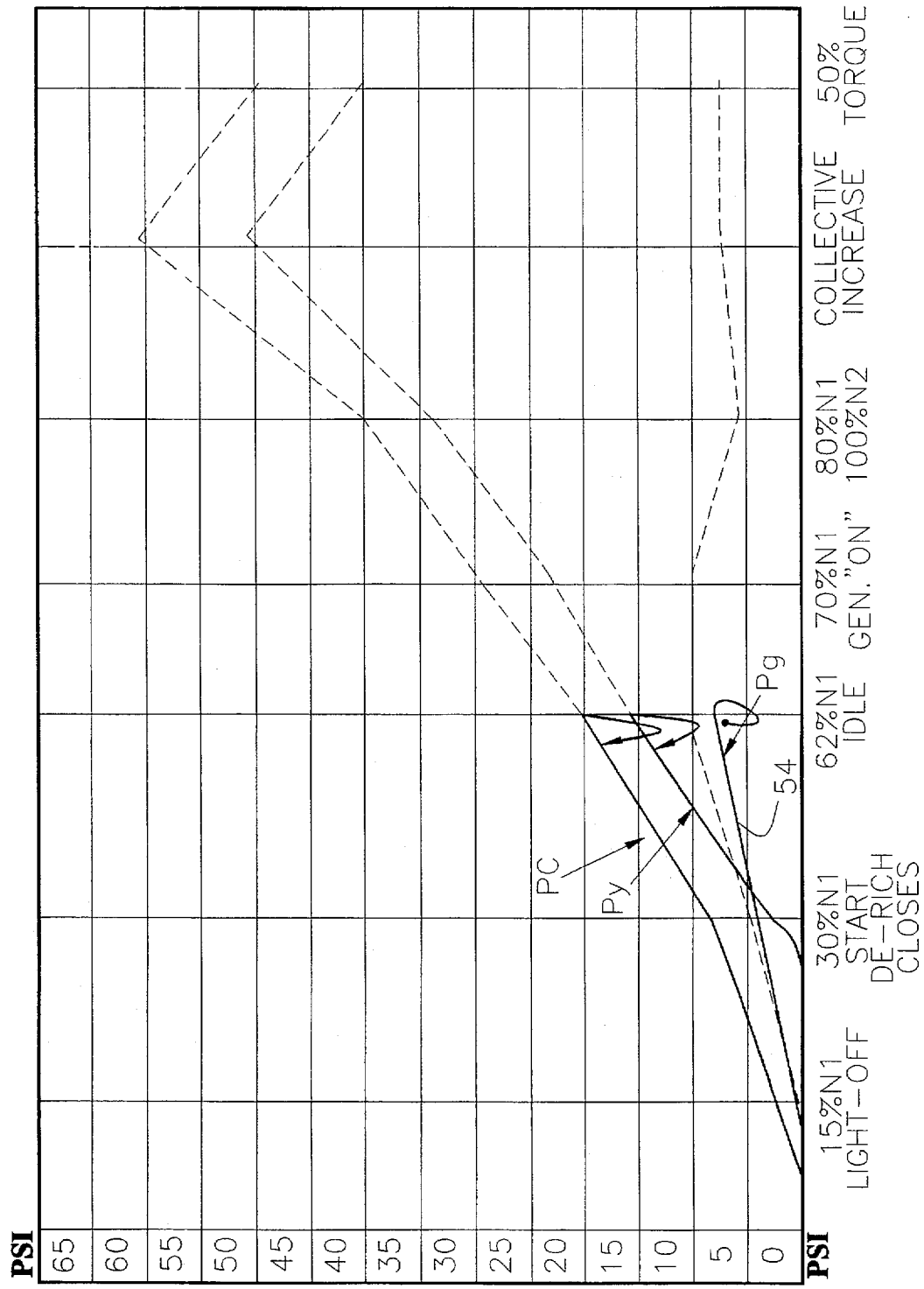
FIG. 5 is a graphical depiction of the curves of FIG. 2 along with a set of curves representative of low governor pressure (Pg) taken at some time later than the curves of FIG. 2.

Referring now to FIG. 5, a graphical depiction of the footprint curves is set out. Also set out is the curve 54 which is representative of an engine taken at a time subsequent to the taking of the footprint curves. The curve 54 depicts the governor pressure (Pg). As shown, the Pg response is low as compared to the initial Pg. Therefore, this could represent that the idle speed is too low. Alternatively, it may be that the engine will not advance above the idle speed. Other possible scenarios include that the engine oscillates which causes the N2 RPM to "hunt". Also, the engine may experience "underspeed" or uncontrolled deceleration.

On the other hand, the engine may produce low power. Also, the engine may be unstable above the idle. Further, the N2 may be slow to respond. Thus, in accordance with the teachings of this invention, the monitoring of the engine has taken place, and based on analysis of the footprint curves and responses taken at some later time, troubleshooting of problems has occurred. Thereafter, appropriate action could be taken to solve the problem (or problems).

An illustrative list of other problems which may be detected when the Py is high include: uncontrollable acceleration; engine surge during start; and/or engine overspeed during flight. When the Pg is high, an illustrative list includes: the engine oscillating; and N2 RPM hunting. Also, the engine may undershoot idle when the throttle is rolled back.

Figure 6:
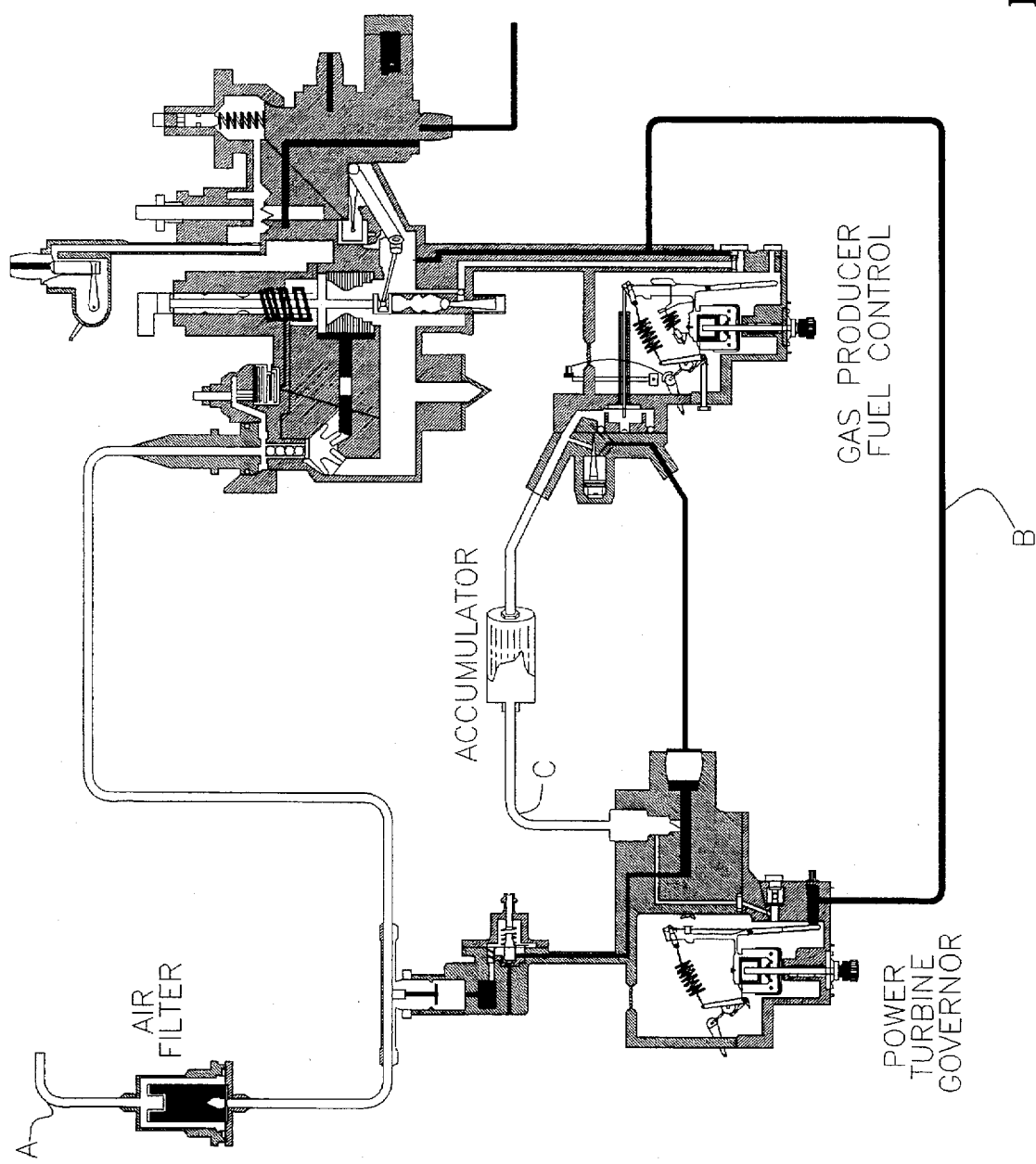
FIG. 6 is a schematic of a typical Fuel Control System.

With reference to FIG. 6, a typical Fuel Control System schematic is depicted. The Tee-member 32 may be placed at point A; the Tee-member 36 may be placed at point B; and, the Tee-member 40 may be placed at point C. The Tee-members with the associated flexible tubes 30, 34, and 38 may be installed in accordance with the teachings of the present invention to the test box 22.

Changes and modifications in the specifically described embodiments can be carried out without departing from the scope of the invention which is intended to be limited only by the scope of the appended claims.

I claim:

1. A method of analyzing a gas turbine pneumatic fuel system, with the system containing a fuel control device, a power turbine governor, and a gas turbine engine assembly, the method comprising the steps of:

obtaining a first baseline set of pressures from said fuel system at an initial start time, and wherein said step of obtaining a first baseline set of pressures includes generating a curve of the pressure of the governor (Pg); generating a curve of the pressure of the compressor (Pc); and generating a curve of the operating pressure (Py);

obtaining a second baseline set of pressure from said fuel system at a second start time;

comparing said first baseline set of pressure with said second baseline set of pressures; and, analyzing said first baseline set of pressure with said second baseline set of pressures in order to determine abnormal operation of said fuel system.

2. The method of claim 1 wherein said step of obtaining a second baseline set of pressures includes:

generating a curve of the pressure of the governor (Pg);

generating a curve of the pressure of the compressor (Pc);

generating a curve of the operating pressure (Py).

3. The method of claim 2 wherein said step of generating a curve for the first baseline pressure of the governor includes taking a pressure reading at the following:

15% of the compressor speed;
30% of the compressor speed;
70% of the compressor speed; and,
80% of the compressor speed.

4. The method of claim 3 wherein said step of generating a curve for the first baseline operating pressure between said governor and said fuel control device includes taking a pressure reading at the following:

15% of the compressor speed;
30% of the compressor speed;
70% of the compressor speed; and,
80% of the compressor speed.

5. The method of claim 4 wherein said step of generating a curve for the first baseline pressure of said compressor includes taking a pressure reading at the following:

15% of the compressor speed;
30% of the compressor speed;
70% of the compressor speed; and,
80% of the compressor speed.

6. The method of claim 5 wherein said step of generating a curve for the second baseline pressure of the governor includes taking a pressure reading at the following:

15% of the compressor speed;
30% of the compressor speed;
70% of the compressor speed; and,
80% of the compressor speed.

7. The method of claim 6 wherein said step of generating a curve for the second baseline operating pressure between said governor and said fuel control device includes taking a pressure reading at the following:

15% of the compressor speed;
30% of the compressor speed;
70% of the compressor speed; and,
80% of the compressor speed.

8. The method of claim 7 wherein said step of generating a curve for the second baseline pressure of said compressor includes taking a pressure reading at the following:

15% of the compressor speed;
30% of the compressor speed;
70% of the compressor speed; and,
80% of the compressor speed.

9. An apparatus for analyzing a gas turbine pneumatic fuel system comprising:

a gas turbine engine assembly, with said gas turbine engine being connected with a first conduit means for transmitting a pressure;

a governor operatively associated with said gas turbine engine assembly;

a fuel control device, operatively connected with said governor with a second conduit means for transmitting a pressure between said governor and said fuel control device;

pressure monitoring means for obtaining the pressure contained within said first and second conduit means, and wherein said pressure monitoring means comprises: a module having a pressure gauge for obtaining the pressures contained within said first and second conduit means; a compressor discharge pressure tubing means, operatively associated with said first conduit, for obtaining said pressure of said compressor; an operating pressure tubing means, operatively associated with said second conduit, for obtaining said operating pressure of said governor and said fuel control device; and, a governor pressure tubing means, operatively associated with said second conduit, for obtaining said pressure of said governor.

10. The apparatus of claim 9 wherein said module comprises:

a compressor discharge pressure gauge means for measuring said discharge pressure contained within said compressor discharge pressure tubing.

11. The apparatus of claim 10 wherein said module further comprises:

an operating pressure gauge means for measuring said operating pressure contained within said operating pressure tubing means.

12. The apparatus of claim 11 wherein said module further comprises:

a governor pressure gauge means for measuring said governor pressure contained within said governor pressure tubing means.

* * * * *